(No Model.)
I. V. HICKS.
VEHICLE CIRCLE PLATE.
No. 249,765. Patented Nov. 22, 1881.
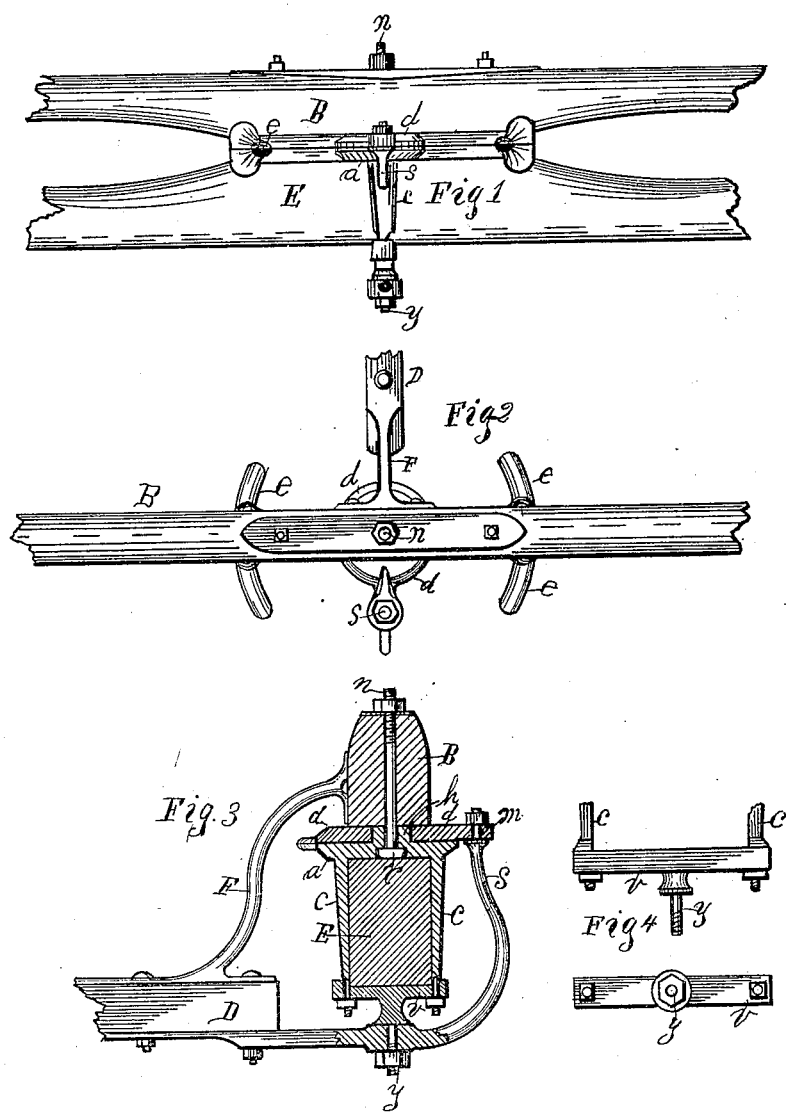

UNITED STATES PATENT OFFICE.

IRA V. HICKS, OF KALAMAZOO, MICHIGAN, ASSIGNOR OF TWO-THIRDS TO FREDERICK MYERS AND M. HENRY LANE, BOTH OF SAME PLACE.

VEHICLE CIRCLE-PLATE.

SPECIFICATION forming part of Letters Patent No. 249,765, dated November 22, 1881.

Application filed June 13, 1881. (No model.)

*To all whom it may concern:*

Be it known that I, IRA V. HICKS, a citizen of the United States, residing at Kalamazoo, county of Kalamazoo, State of Michigan, have invented new and useful Improvements in Vehicle Circle-Plates, of which the following is a specification.

The object of my invention consists in the construction and combination of parts, hereinafter set forth, whereby the use of a king-bolt or pivots located in or through the axle and bolster of vehicles may be dispensed with entirely, or, if used, their size and strength may be greatly diminished, thus effecting a diminution of the size of the axle and bolster without diminishing their strength.

In the drawings, forming a part of this specification, Figure 1 is a front view of axle and bolster; Fig. 2, top view of bolster; Fig. 3, cross-section near a line from *n* to *y* in Fig. 1; and Fig. 4 shows bottom and side view of mechanism beneath the axle.

*a* is the axle-plate, having the center projection, *h;* and *d*, the bolster-plate, having a center recess, in which projection *h* is located.

*n* is a light king-bolt, having its head *r* located in the recess of projection *h*.

*s* is a brace of a common construction, secured to the under side of the reach D and intercepting stud *y*, with its upper end connected with projection *m* of plate *a*. Thus far my device is somewhat similar to former constructions in which heavy king-bolts or pivots have been employed. By the addition of detachable brace F to this peculiar combination, secured to the upper side of reach D and the rear side of bolster B, all bolts and pivots may be dispensed with, the bolster turning on projection *h* of the plate *a*.

What I claim and desire to secure is—

In a circle-plate construction, the axle and bolster provided with the plates having the center recess and upwardly-extending stud and brace *s*, in combination with the detachable brace F, having its upper end secured to the rear side of bolster B, as shown, for the purposes set forth.

IRA V. HICKS.

Witnesses:
E. W. HURLBUT,
FRANK C. GIBBS.